(12) United States Patent
Gupta et al.

(10) Patent No.: US 12,095,756 B2
(45) Date of Patent: Sep. 17, 2024

(54) METHOD AND DEVICE FOR PERFORMING ONBOARDING

(71) Applicant: Samsung Electronics Co., Ltd., Gyeonggi-do (KR)

(72) Inventors: Nishant Gupta, Uttar Pradesh (IN); Rajavelsamy Rajadurai, Bangalore (IN); Narendranath Durga Tangudu, Bangalore (IN)

(73) Assignee: Samsung Electronics Co., Ltd (KR)

( * ) Notice: Subject to any disclaimer, the term of this patent is extended or adjusted under 35 U.S.C. 154(b) by 705 days.

(21) Appl. No.: 16/981,121

(22) PCT Filed: Apr. 8, 2019

(86) PCT No.: PCT/KR2019/004140
§ 371 (c)(1),
(2) Date: Sep. 15, 2020

(87) PCT Pub. No.: WO2019/194665
PCT Pub. Date: Oct. 20, 2019

(65) Prior Publication Data
US 2021/0037007 A1 Feb. 4, 2021

(30) Foreign Application Priority Data

Apr. 6, 2018 (IN) .................. 201841013296 PS
Apr. 4, 2019 (IN) .................. 201841013296 CS

(51) Int. Cl.
*H04L 29/06* (2006.01)
*G06F 9/54* (2006.01)
(Continued)

(52) U.S. Cl.
CPC ........ *H04L 63/0823* (2013.01); *G06F 9/546* (2013.01); *G06Q 30/0185* (2013.01); *H04L 9/3073* (2013.01); *H04L 63/0884* (2013.01)

(58) Field of Classification Search
CPC ............ H04L 63/0823; H04L 63/0884; H04L 9/3073; G06F 9/546; G06Q 30/0185; H04W 12/084
See application file for complete search history.

(56) References Cited

U.S. PATENT DOCUMENTS 11,038,841 B2 * 6/2021 Palnati .............. H04W 52/0229
11,533,594 B2 * 12/2022 Purkayastha ........... H04W 4/02
2005/0086504 A1 * 4/2005 You ..................... H04L 63/0823
713/193

(Continued)

FOREIGN PATENT DOCUMENTS

CN            1885771       12/2006
WO     WO 2019/194242     10/2019

OTHER PUBLICATIONS

3rd Generation Partnership Project; Technical Specification Group Services and System Aspects; Study on Common API Framework for 3GPP Northbound APIs (Release 15), 3GPP TR 23. 722 V1 .0.0 (Sep. 2017) (Year: 2017).*

(Continued)

*Primary Examiner* — Luu T Pham
*Assistant Examiner* — Fahimeh Mohammadi
(74) *Attorney, Agent, or Firm* — The Farrell Law Firm, P.C.

(57) ABSTRACT

Provided is an API invoker of performing an onboarding. The API invoker includes a transceiver and a processor coupled with the transceiver and configured to obtain, from a service provider, onboarding information including an onboarding credential and information of a CAPIF core function, establish a secure session with the CAPIF core function based on the onboarding information and control the transceiver to transmit, to the CAPIF core function, an onboard API invoker request message along with the onboarding credential and to receive an onboard API (Continued)

invoker response message based on a result of a validating the onboarding credential at the CAPIF core function.

14 Claims, 12 Drawing Sheets

(51) Int. Cl.
 *G06Q 30/018* (2023.01)
 *H04L 9/30* (2006.01)
 *H04L 9/40* (2022.01)

(56) References Cited

U.S. PATENT DOCUMENTS

| | | | |
|---|---|---|---|
| 2006/0294366 | A1 | 12/2006 | Nadalin et al. |
| 2009/0235349 | A1 | 9/2009 | Lai et al. |
| 2013/0191884 | A1* | 7/2013 | Leicher .............. H04L 63/08 726/4 |
| 2014/0086177 | A1* | 3/2014 | Adjakple ............ H04W 74/04 370/329 |
| 2014/0331240 | A1 | 11/2014 | Zhao et al. |
| 2016/0088109 | A1* | 3/2016 | Chen .................. H04L 67/10 709/203 |
| 2016/0254918 | A1* | 9/2016 | Liu .................. H04L 63/0823 713/156 |
| 2016/0350261 | A1* | 12/2016 | Tsirkin ............. G06F 15/17331 |
| 2017/0163618 | A1* | 6/2017 | Peddada ............ H04L 9/3236 |
| 2017/0187708 | A1 | 6/2017 | Moore et al. |
| 2019/0334718 | A1* | 10/2019 | Li ..................... H04L 9/3226 |
| 2020/0089552 | A1* | 3/2020 | Pattan .................. H04M 15/00 |
| 2020/0177578 | A1* | 6/2020 | Chatnalli Deshpande Sridhar ..... H04L 67/10 |
| 2020/0341826 | A1* | 10/2020 | Ge ..................... H04W 12/082 |
| 2021/0144551 | A1* | 5/2021 | Lee .................... H04W 12/043 |

OTHER PUBLICATIONS

Taka Yoshizawa, Issues of functionalities in the CAPIF TS 23.222, Nov. 27-Dec. 1, 2017, NEC, 3GPP TSG-SA WG6 Metting #20. pp. 1-9. (Year: 2017).*

Taka Yoshizawa, Pseudo—CR on CAPIF authentication related requirements and procedures, Nov. 27-Dec. 1, 2017, NEC, 3GPP TSG-SA WG6 Metting #20. pp. 1-11. (Year: 2017).*

The OAuth 2.0 Authorization Framework: Bearer Token Usage, Oct. 2012, Request for Comments: 6750, pp. 1-19. (Year: 2012).*

European Search Report dated Nov. 14, 2022 issued in counterpart application No. 19781057.5-1218, 5 pages.

PCT/ISA/210 Search Report issued on PCT/KR2019/004140, Aug. 1, 2019, pp. 3.

PCT/ISA/237 Written Opinion issued on PCT/KR2019/004140, Aug. 1, 2019, pp. 7.

3GPP TR 23.722, V15.1.0, Apr. 3, 2018, 3rd Generation Partnership Project; Technical Specification Group Services and System Aspects; Study on Common API Framework for 3GPP Northbound APIs (Release 15), pp. 67.

LG Electronics, "Editorial Corrections", S6-180132, 3GPP TSG-SA WG6 Meeting #21, Jan. 22-26, 2018, 45 pages.

European Search Report dated Mar. 15, 2021 issued in counterpart application No. 19781057.5-1218, 8 pages.

Chinese Office Action dated Jul. 14, 2023 issued in counterpart application No. 201980024053.8, 24 pages.

Chinese Office Action dated Jan. 18, 2024 issued in counterpart application No. 201980024053.8, 22 pages.

Chinese Notice of Allowance dated Apr. 30, 2024 issued in counterpart application No. 201980024053.8, 4 pages.

European Search Report dated Apr. 24, 2024 issued in counterpart application No. 19781057.5-1218, 6 pages.

* cited by examiner

[Fig. 2]
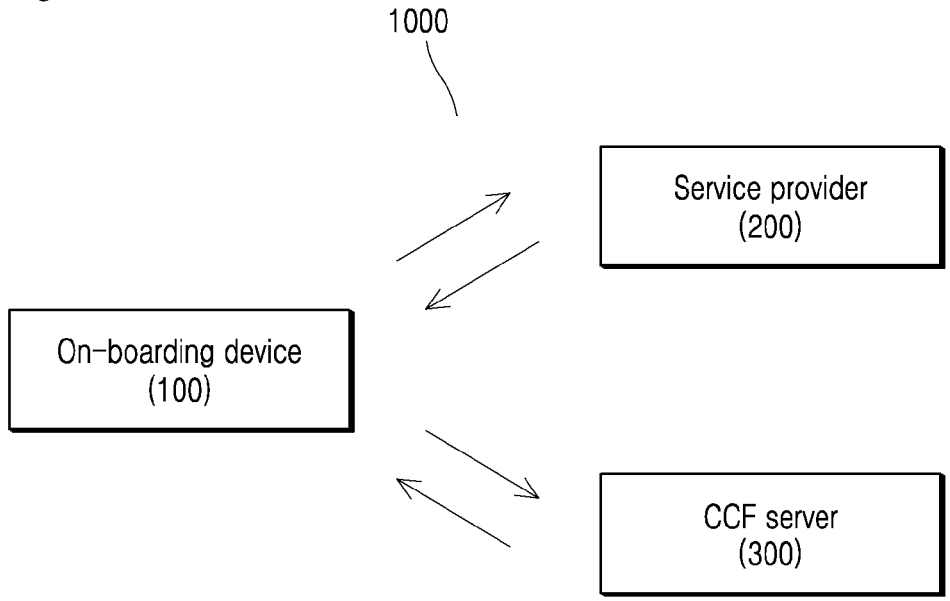
[Fig. 3a]
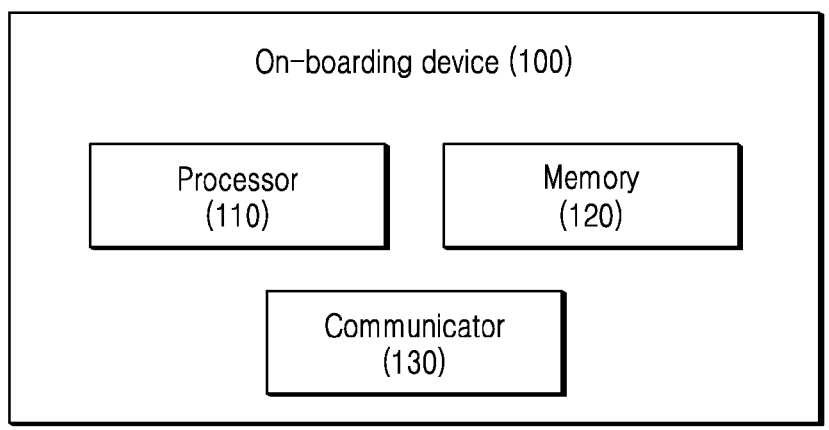
[Fig. 3b]
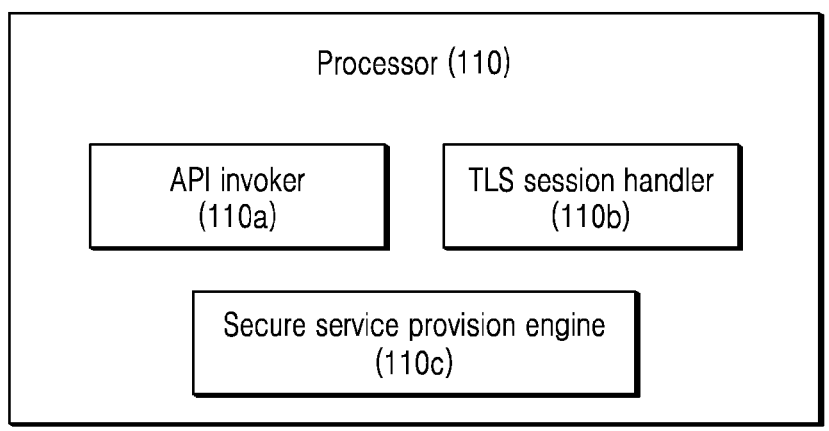

[Fig. 4]
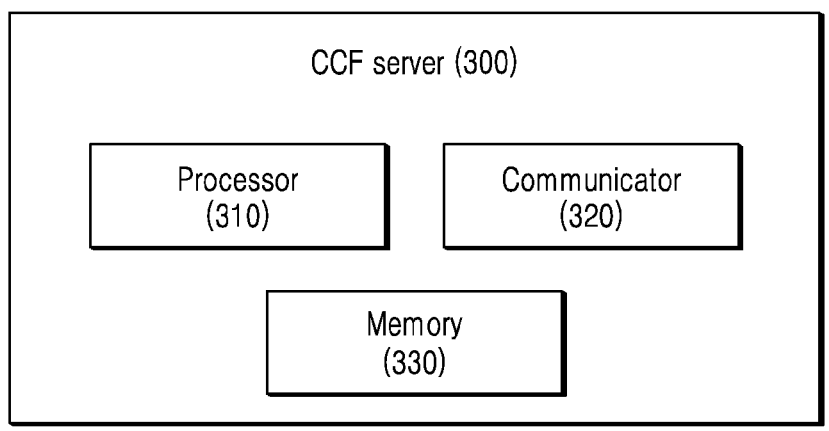
[Fig. 5]
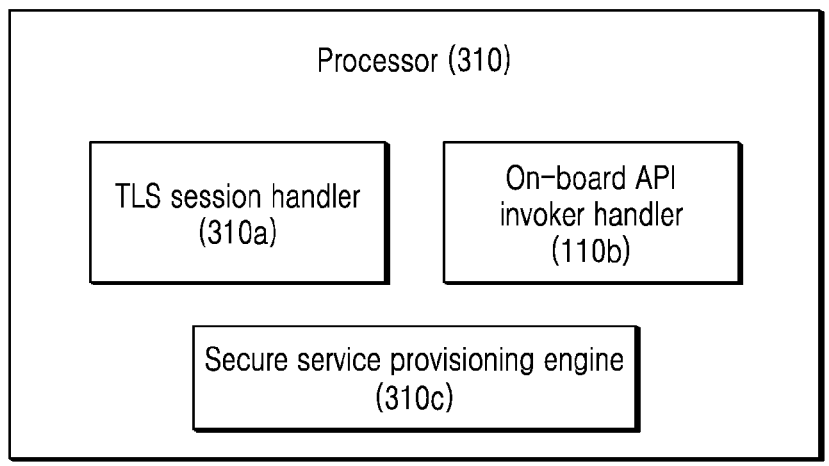

[Fig. 6]
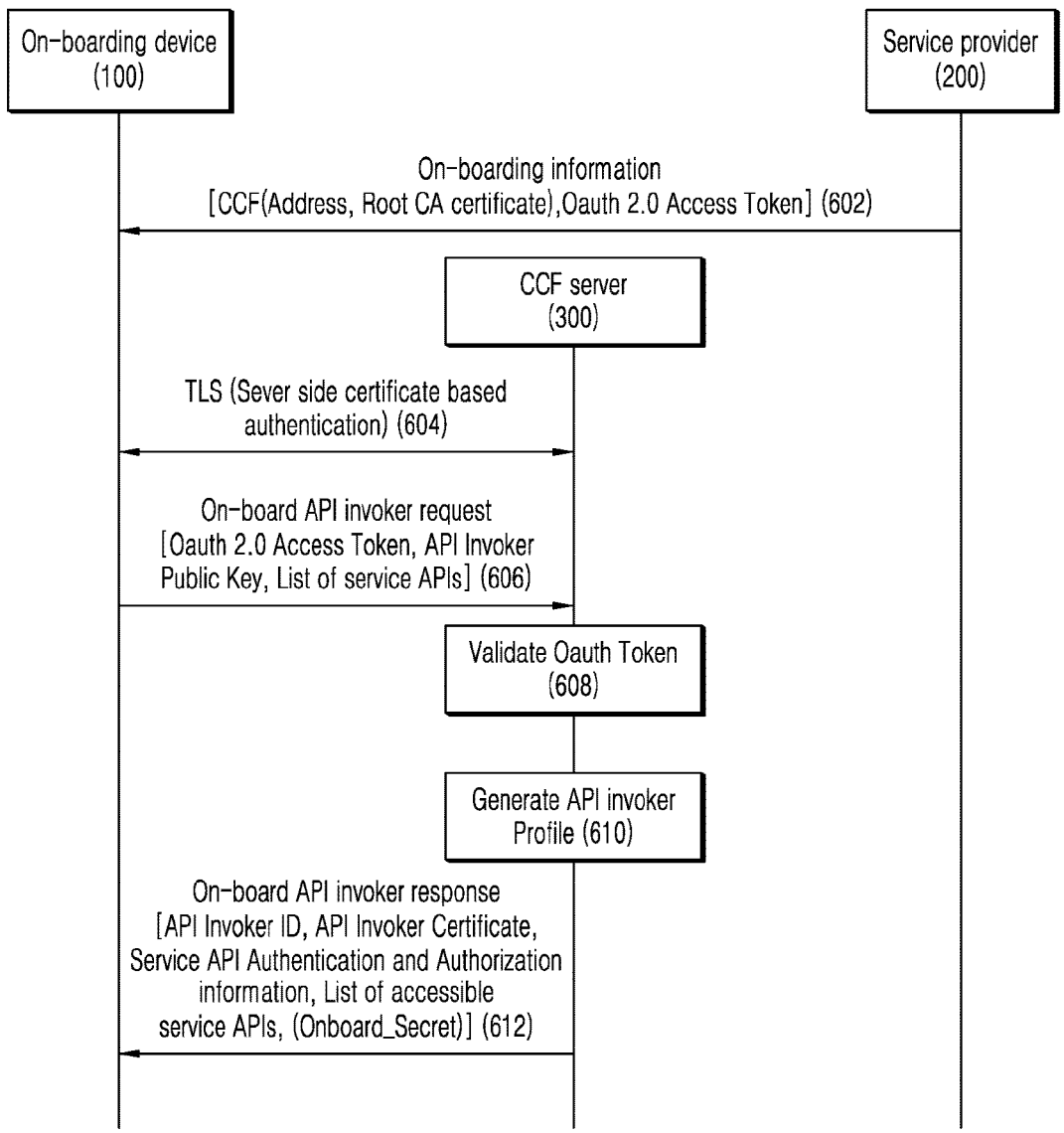

[Fig. 7]
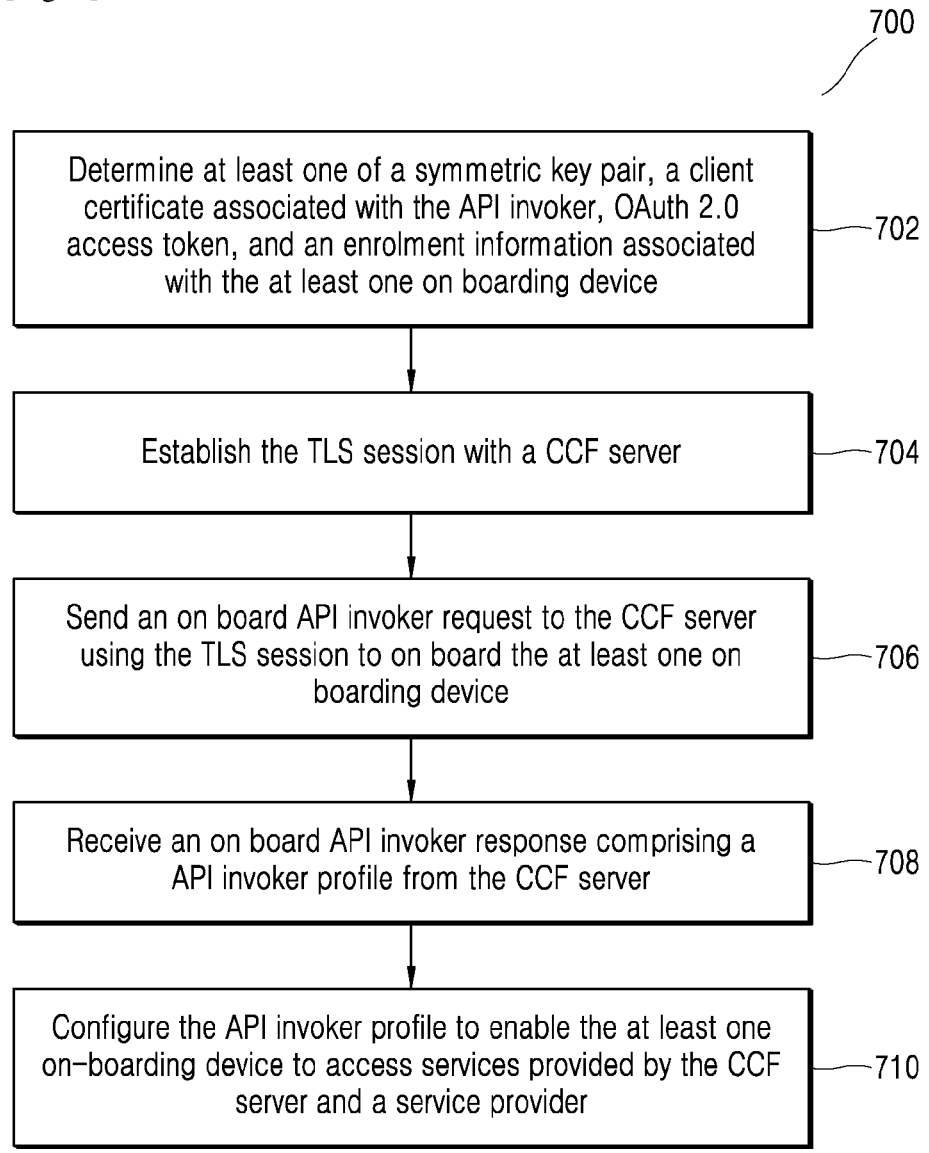

[Fig. 8]
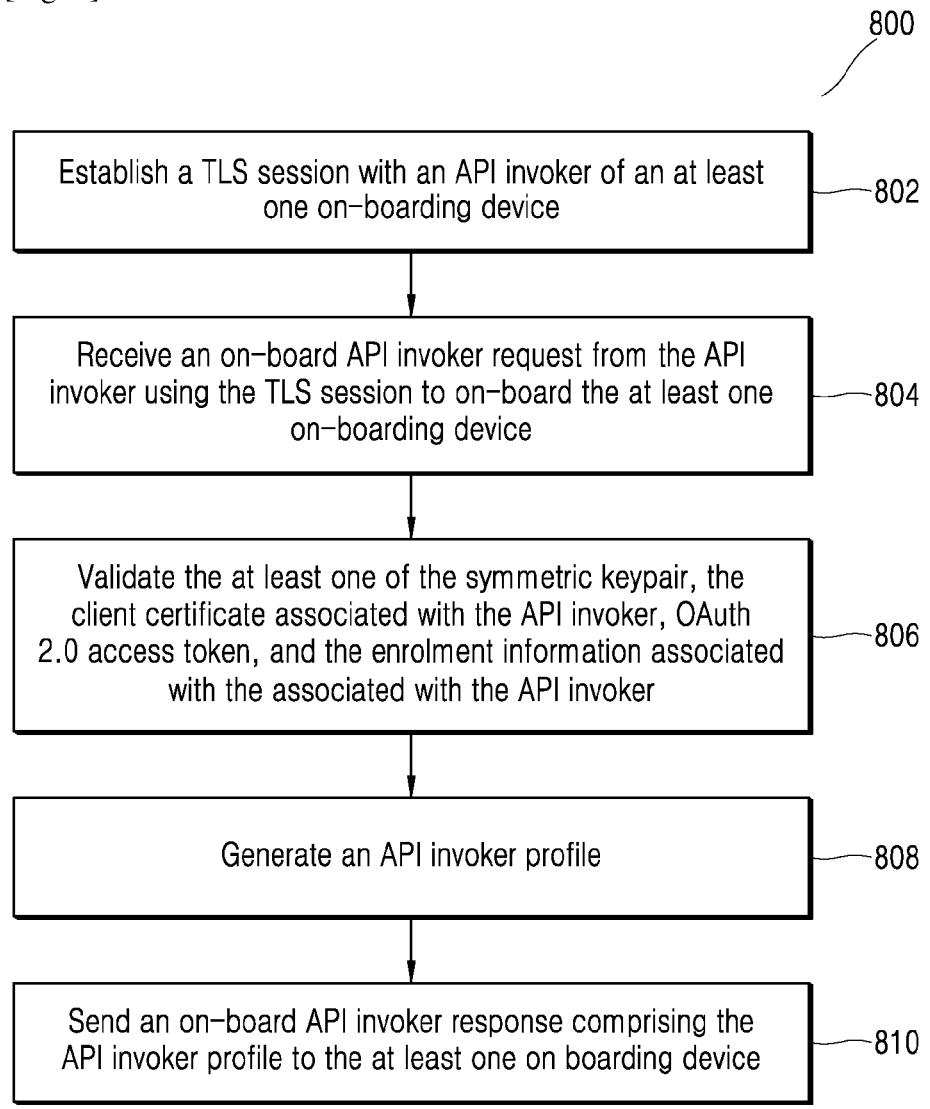

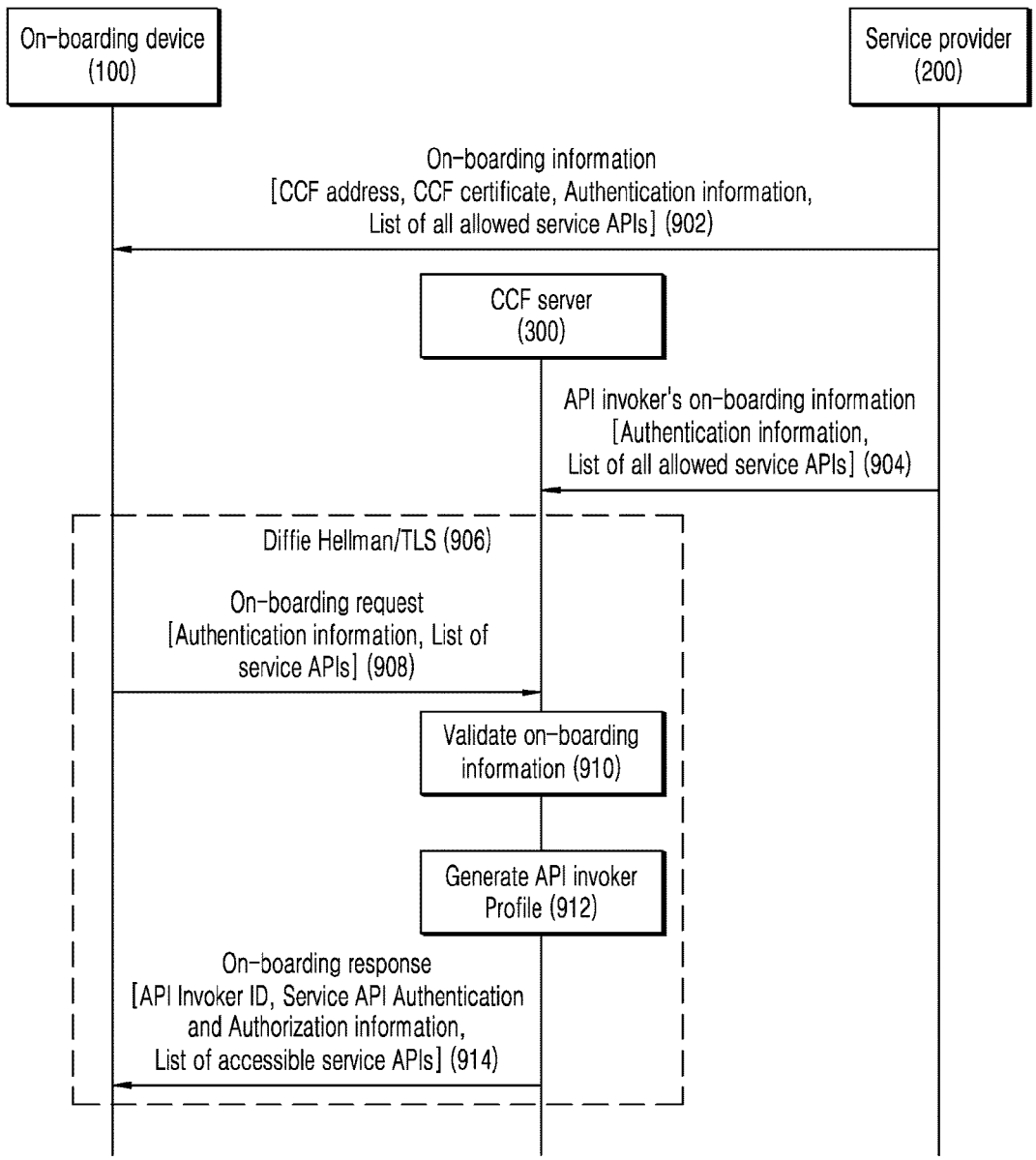

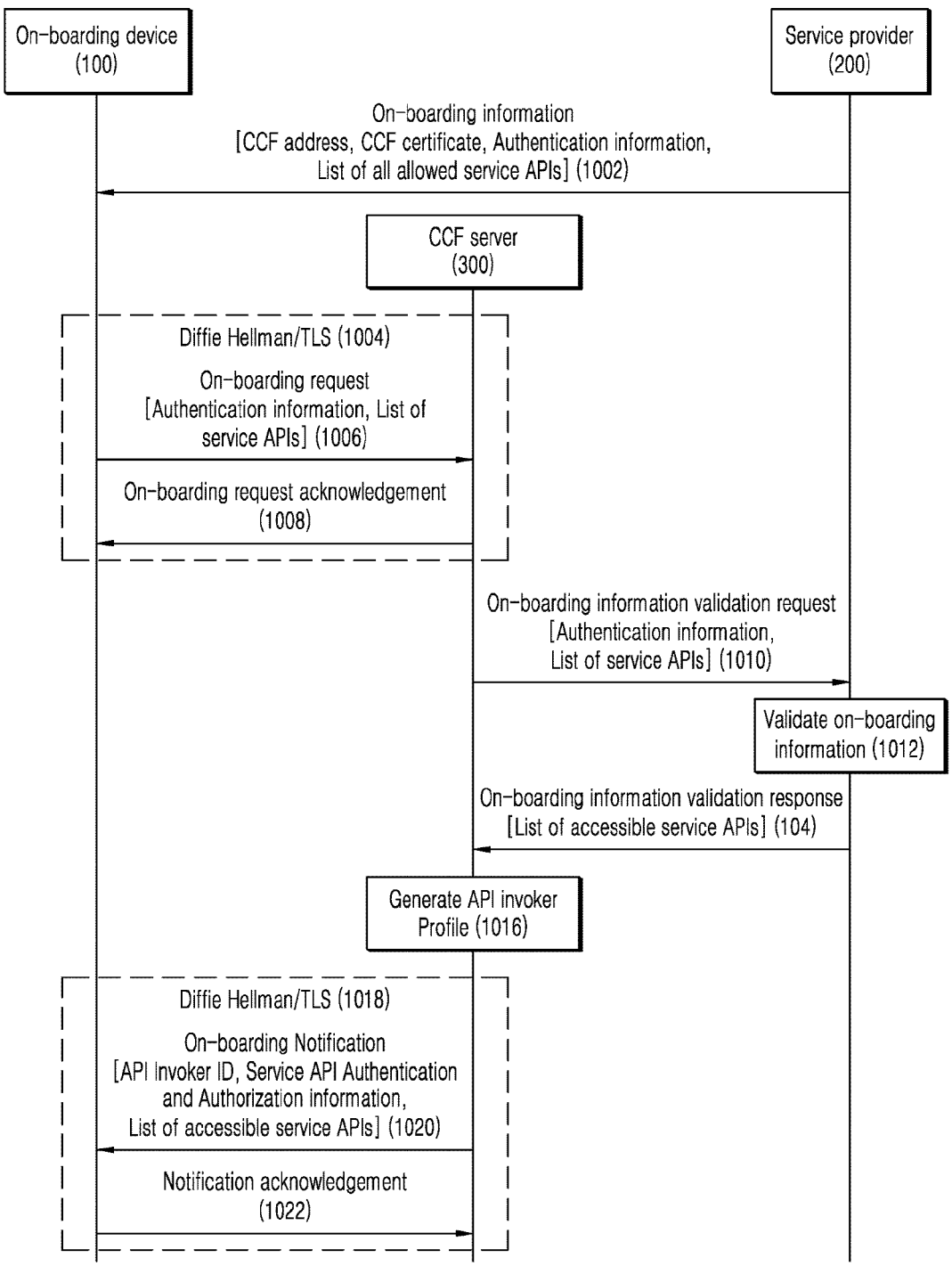
[Fig. 10]

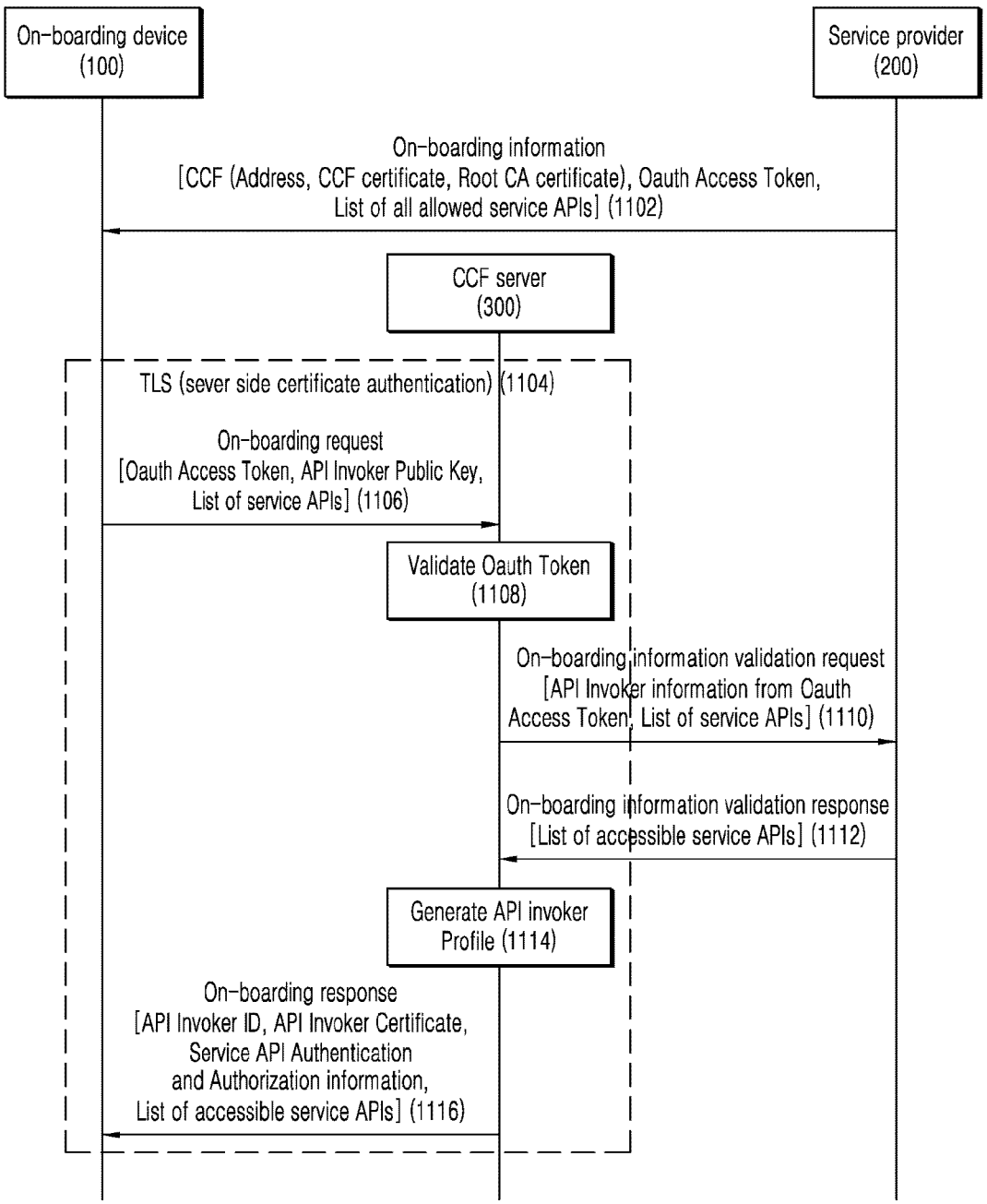
[Fig. 11]

[Fig. 12]
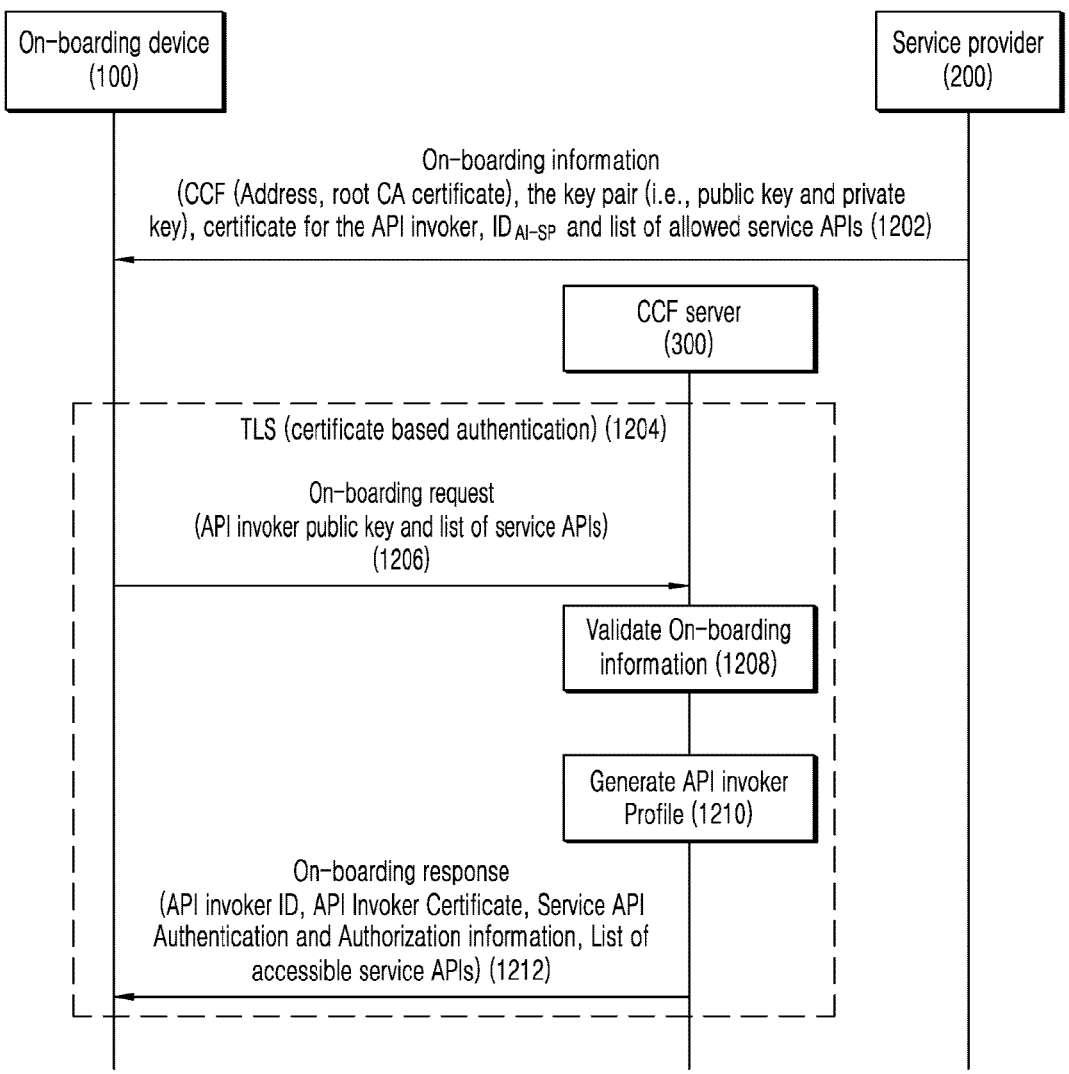

[Fig. 13]
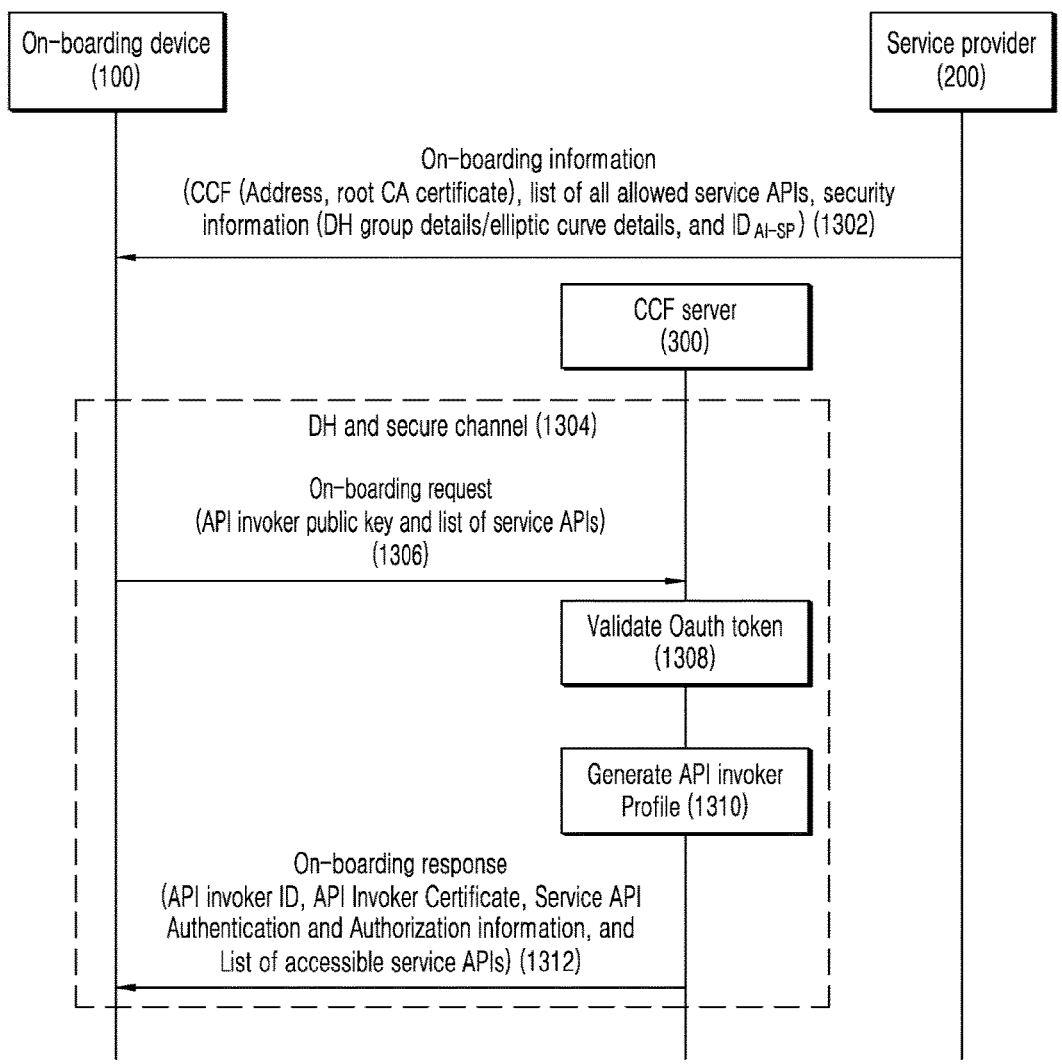
[Fig. 14]
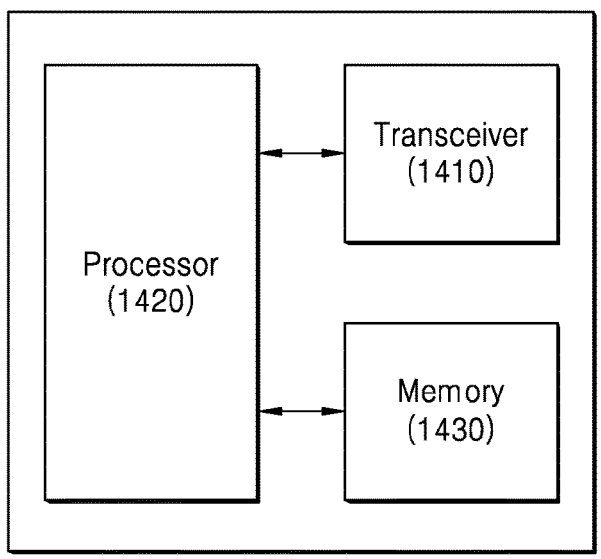

[Fig. 15]
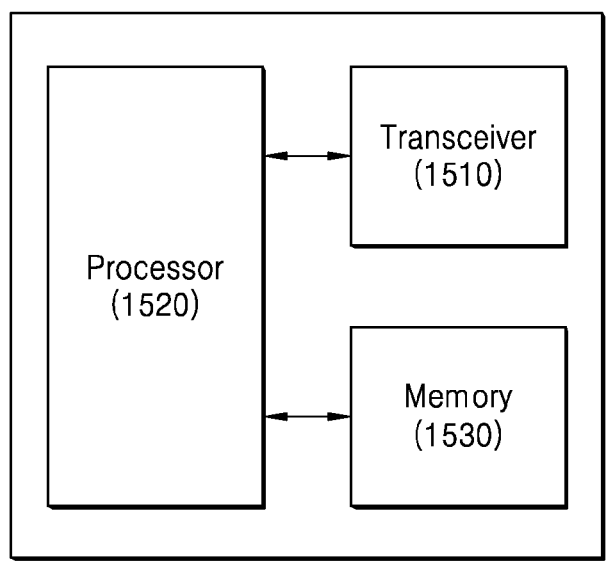

METHOD AND DEVICE FOR PERFORMING ONBOARDING

PRIORITY

This application is a National Phase Entry of PCT International Application No. PCT/KR2019/004140 which was filed on Apr. 8, 2019, and claims priority to Indian Patent Application Nos. 201841013296 PS and 201841013296 CS, which were filed on Apr. 6, 2018 and Apr. 4, 2019, respectively, the content of each of which is incorporated herein by reference.

TECHNICAL FIELD

The present disclosure related to an on-boarding system, and more specifically related to secure on-boarding of application programming interface (API) invoker of on-boarding devices to a Common API Framework (CAPIF) Core function (CCF) server.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE OF INVENTION

Technical Problem

The embodiments herein is to provide a method and system for secure on-boarding of application programming interface (API) invoker of on-boarding devices to a Common API Framework (CAPIF) Core function (CCF) server.

Solution to Problem

Provided is an API invoker of performing an onboarding. The API invoker includes a transceiver and a processor coupled with the transceiver and configured to obtain, from a service provider, onboarding information including an onboarding credential and information of a CAPIF core function, establish a secure session with the CAPIF core function based on the onboarding information and control the transceiver to transmit, to the CAPIF core function, an onboard API invoker request message along with the onboarding credential and to receive an onboard API invoker response message based on a result of a validating the onboarding credential at the CAPIF core function.

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which:

FIG. 2 illustrates a system for handling secure on-boarding of an on-boarding device, according to an embodiment as disclosed herein;

FIG. 3a is a block diagram of an on-boarding device, according to an embodiment as disclosed herein;

FIG. 3b illustrates various components of a processor of the on-boarding device to handle secure on-boarding of the on-boarding device, according to an embodiment as disclosed herein;

FIG. 4 illustrates various component of a CCF server, according to an embodiment as disclosed herein;

FIG. 5 illustrates various components of a processor of the CCF server to handle secure on-boarding of the on-boarding device, according to embodiment as disclosed herein;

FIG. 6 is example scenario of a token based secure on-boarding to handle secure on-boarding of the on-boarding device, according to the embodiments as disclosed herein;

FIG. 7 is a flow chart illustrating a method, implemented by the on-boarding device, for handling secure on-boarding of the API invoker, according to the embodiments as disclosed herein;

FIG. 8 is a flow chart illustrating a method, implemented by the CCF server, for handling secure on-boarding of the API invoker, according to the embodiments as disclosed herein;

FIG. 9 and FIG. 10 are another example scenarios in which the system handles secure on-boarding of the on-boarding device, according to embodiment as disclosed herein;

FIG. 11 is another example scenario of the token based secure on-boarding for handling secure on-boarding of the on-boarding device, according to embodiment as disclosed herein;

FIG. 12 is a sequential diagram illustrating a certificate based authentication between the API invoker and the CCF for on-boarding of API invoker, according to the embodiments as disclosed herein; and FIG. 13 is a sequential diagram illustrating an example scenario in which a DH based key is established between the API invoker and the CCF for secure on-boarding of the API invoker, according to the embodiments as disclosed herein.

FIG. 14 is a diagram illustrating an API invoker 1400 according to another embodiment of the present disclosure.

FIG. 15 is a diagram illustrating an API invoker 1500 according to another embodiment of the present disclosure.

BEST MODE FOR CARRYING OUT THE INVENTION

Figure 1:
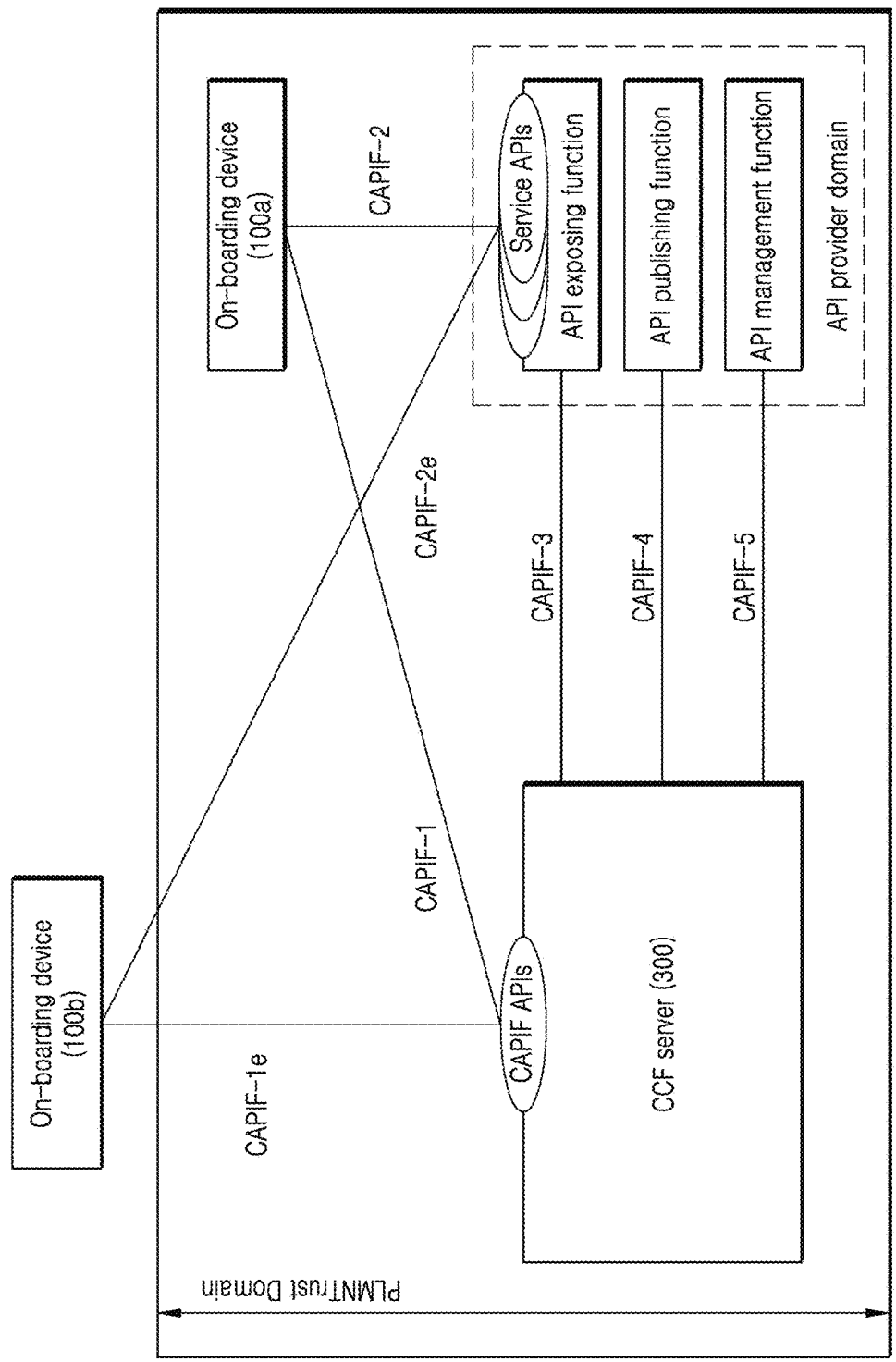
FIG. 1 is example scenario illustrating a functional model for a CCF server.

According to an embodiment of the disclosure, an API invoker of performing an on-boarding, the API invoker includes a transceiver; and a processor coupled with the transceiver and configured to: obtain, from a service provider, onboarding information including an onboarding credential and information of a CAPIF core function, establish a secure session with the CAPIF core function based on the onboarding information and control the transceiver to: transmit, to the CAPIF core function, an onboard API invoker request message along with the onboarding credential and receive an onboard API invoker response message based on a result of a validating the onboarding credential at the CAPIF core function.

The processor may be further configured to: generate a key pair including a private key and a public key, and provide the public key along with the onboard API invoker request message.

The information of the CAPIF core function may include an address and root CA certificate.

The onboard API invoker response message may include an assigned API invoker ID, authentication and authorization information and API invoker's certificate.

The onboarding credential may include an OAuth 2.0 access token.

The service provider may include an AEF (API exposing function), APF (API publishing function) and AMF (API management function).

The onboard API invoker request message includes a list of APIs in which the API invoker intends to invoke.

The onboard API invoker response message includes a list of APIs allowed to invoke.

In response to a certificate of the API invoker being issued by a certificate authority, the onboard API invoker request message includes the certificate.

According to another embodiment of the disclosure, a CAPIF core function of performing an onboarding, the CAPIF core function includes a transceiver; and a processor coupled with the transceiver and configured to: establish a secure session with an API invoker based on onboarding information including an onboarding credential, control the transceiver to receive, from the API invoker, an onboard API invoker request message along with the onboarding credential, validate the onboarding credential, and control the transceiver to transmit an onboard API invoker response message based on a result of a validating the onboarding credential.

The processor may be further configured to: in response to a validation of the on-boarding credential being successful, generate an API invoker profile including authentication and authorization information between the API invoker and the AEF.

In response to a certificate of the API invoker being issued by a certificate authority and the certificate authority being determined to be trusted, the API invoker profile may include the certificate.

The onboard API invoker response message may include an assigned API invoker ID, authentication and authorization information and API invoker's certificate.

According to another embodiment of the disclosure, a method of performing an on-boarding, by an API invoker, the method includes: obtaining, from a service provider, onboarding information including an onboarding credential and information of a CAPIF core function; establishing a secure session with the CAPIF core function based on the onboarding information; transmitting, to the CAPIF core function, an onboard API invoker request message along with the onboarding credential; and receiving an onboard API invoker response message based on a result of a validating the on-boarding credential at the CAPIF core function.

According to another embodiment of the disclosure, a method of performing an on-boarding, by an CAPIF core function, the method includes: establishing a secure session with an API invoker based on onboarding information including an on-boarding credential; receiving, from the API invoker, an onboard API invoker request message along with the onboarding credential; validating the onboarding credential; and transmitting an onboard API invoker response message based on a result of a validating the onboarding credential.

MODE FOR THE INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

The terms "CAPIF core function entity", "CAPIF core function", "CCF", "CCF entity" and CCF server are used interchangeably in the disclosure. The CCF provides mechanisms (e.g. publish service APIs, authorization, logging, charging) to support service API operations.

The terms 'service provider' and 'API provider domain' mean same and refer to the service API provider domain. The terms are used interchangeably throughout the document and related drawings.

3rd Generation Partnership Project (3GPP) has defined a common API framework to support 3GPP Northbound APIs with common functional aspects such as authentication, authorization, discovery, registration, monitoring etc. Further, 3GPP TS 23.222 defines a functional architecture and information flows for the common API framework. The specification of the 3GPP TS 23.222 defines functional entities such as API invoker (AI) and Common API Framework (CAPIF) Core function (CCF) entity along with service provider domain functions such as API Exposing Function (AEF), API publishing function (APF) and API management function (AMF). The specification also defines the reference points between the functional entities— CAPIF-1/CAPIF-1e reference points between AI and CCF, CAPIF-2/CAPIF-2e between the AI and the AEF, CAPIF-3 reference points between the CCF and the AEF, CAPIF-4 reference points between the CCF and the APF, and CAPIF-5 reference points between the CCF and AMF.

In order to access APIs (Framework APIs and Service APIs), the API invoker first needs to be on-boarded to the common API Framework. The on-boarding process involves obtaining, from CAPIF, an ID of the API invoker, authentication information, authorization information etc., which are necessary to access the APIs.

FIG. 1 is example scenario illustrating a functional model for the CCF server 300. In an example, the on-boarding device 100a within a PLMN trust domain interacts with the CAPIF server 300 via the CAPIF-1 and the CAPIF-2. The on-boarding device 100b from outside the PLMN trust domain interacts with the CAPIF server 300 via CAPIF-1e and CAPIF-2e. The API exposing function, the API publishing function and the API management function of the API provider domain (together known as API provider domain functions) within the PLMN trust domain interacts with the CCF server 300 via CAPIF-3, CAPIF-4 and CAPIF-5 respectively. Thus, it is desired to address the above mentioned disadvantages or other shortcomings or at least provide a useful alternative.

Accordingly, the embodiments herein achieve a method for handling secure on-boarding of at least one on-boarding device. The method includes determining, by the at least one on-boarding device, at least one of a symmetric key-pair, a client certificate associated with an API invoker, and enrollment information associated with the at least one API invoker. Further, the method includes establishing, by the at least one on-boarding device, a TLS session with a CCF server. Further, the method includes sending, by the at least one on-boarding device, an onboard API invoker request to the CCF using the TLS session to onboard the at least one on-boarding device. The onboard API invoker request includes at least one of the symmetric key-pair, the client certificate associated with the API invoker, OAuth 2.0 access token, and the enrollment information. Further, the method includes validating, by the CCF server, the at least one of the symmetric key-pair, the client certificate associated with the API invoker, OAuth 2.0 access token, and the enrollment information associated with the API invoker. Further, the method includes generating, by the CCF server, an API invoker profile in response to successful validation of the at least one of the symmetric key-pair, the client certificate associated with the API invoker, OAuth 2.0 access token, and the enrollment information. Further, the method includes sending, by the CCF server, an onboard API invoker response comprising the API invoker profile to the at least one on-boarding device. Further, the method includes configuring, by the API invoker of the at least one on-boarding device, the API invoker profile to enable the at least one on-boarding device to access services provided by the CCF server and a service provider.

Unlike conventional methods, the proposed method can be used to establish the service contract by the API invoker and a service provider. Further, the method can be used to provide the API invoker with the on-boarding information by the service provider. Further, the CCF server verifies the validity (verifies the authenticity) of the on-boarding information and provides the API invoker with API invoker profile (i.e. information necessary for accessing the APIs (e.g., framework APIs and service APIs)) securely according to the proposed method. This provisions the API invoker to access the services provided by the CCF server and service provider. This enables API invoker to consume CCF server and the service provider services through the framework and the service APIs securely and effective manner.

Various embodiments of the proposed method is adopted in the 3GPP TS 33.122 and 3GPP TS 29.222. The method allows for a systematic way of authorizing on-boarding request from the API invoker and establish a security context between API invoker to be on boarded and CCF server to conduct onboarding process.

Referring now to the drawings, and more particularly to FIGS. 2 through 13, where similar reference characters denote corresponding features consistently throughout the figures, there are shown preferred embodiments.

FIG. 2 illustrates a system 1000 for handling secure on-boarding of an on-boarding device 100, according to the embodiments as disclosed herein. In an embodiment, the system 1000 includes an on-boarding device 100, a service provider 200, and a CCF server 300. The on-boarding device 100 can be, for example but not limited to, an internet of things (IoT) devices, a cellular device, a smart watch or the like.

In an embodiment, the on-boarding device 100 is configured to determine at least one of a symmetric key-pair, a client certificate associated with an API invoker, an OAuth 2.0 access token, and enrolment information associated with the at least one On-boarding device 100. In an embodiment, the enrollment information is obtained from the service provider 200 based on a service API contract between the service provider 200 and the API Invoker. In an embodiment, the symmetric key-pair is generated by the On-boarding device 100. In an embodiment, the client certificate associated with the API invoker is obtained from a third party (not shown).

In an embodiment, the enrollment information includes at least one of information about the CCF server 300 comprising at least one of a CCF server address, a CCF server identity and certificate, and a root certificate to validate the CCF server certificate for a client/server verification, a private-public key pair with a certificate for the API invoker, security credentials for on-boarding, and an OAuth 2.0 access token.

Further, the on-boarding device 100 is configured to establish a TLS session with the CCF server 300. Based on the TLS session, the on-boarding device 100 is configured to send an onboard API invoker request to the CCF server 300 to onboard the at least one on-boarding device 100. The onboard API invoker request includes at least one of the symmetric key-pair, the client certificate, and the enrolment information.

The CCF server 300 receives the onboard API invoker request and the CCF server 300 is configured to validate the at least one of the symmetric key-pair, the client certificate, and the enrollment information. The CCF server 300 is configured to generate an API invoker profile in response to successful validation of the at least one of the symmetric key-pair, the client certificate, and the enrollment information. Further, the CCF server 300 is configured to send an onboard API invoker response comprising the API invoker profile to the at least one on-boarding device 100.

After receiving the API invoker profile, the On-boarding device 100 configures the API invoker profile to enable the at least one on-boarding device 100 to access services provided by the CCF server 300 and the service provider 200.

In an embodiment, the API invoker profile includes information about at least one of: an identity of the API invoker to be used to invoke the API framework, the at least one of APIs, and service APIs, a private-public key pair with a certificate signed by the CCF for the API invoker for a IDAI-CCF, a certificate for the API invoker for an identity IDAI-CCF or IDAI-SP which is digitally signed by the service provider or a CAPIF certificate authority or a trusted certificate authority, and authentication and authorization information for allowed service APIs.

FIG. 3a illustrates various component of the on-boarding device 100, according to the embodiments as disclosed herein. In an embodiment, the on-boarding device 100 includes an on-boarding device 100, a processor 110, a memory 120, and a communicator 130. The processor 110 is coupled with the memory 120 and the communicator 130.

In an embodiment, the processor 110 is configured to determine at least one of the symmetric key-pair, the client certificate associated with the API invoker, and the enrolment information associated with the API Invoker 110. Further, the processor 110 is configured to establish the TLS session with the CCF server 300. Based on the TLS session, the processor 110 is configured to send the onboard API invoker request to the CCF server 300 to onboard the On-boarding device 100. Further, the processor 110 is configured to receive the onboard API invoker response comprising the API invoker profile from the CCF server 300. The processor 110 configures the API invoker profile to enable the at least one on-boarding device to access services provided by the CCF server 300 and the service provider 200.

The processor 110 is configured to execute instructions stored in the memory 120 and to perform various processes. The communicator 130 is configured for communicating internally between internal hardware components and with external devices via one or more networks.

The memory 120 stores instructions to be executed by the processor 110. The memory 120 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 120 may, in some examples, be considered a non-transitory storage medium. The term "non-transitory" may indicate that the storage medium is not embodied in a carrier wave or a propagated signal. However, the term "non-transitory" should not be interpreted that the memory 120 is non-movable. In some examples, the memory 120 can be configured to store larger amounts of information than the memory. In certain examples, a non-transitory storage medium may store data that can, over time, change (e.g., in Random Access Memory (RAM) or cache).

Although the FIG. 3a shows various hardware components of the on-boarding device 100 but it is to be understood that other embodiments are not limited thereon. In other embodiments, the on-boarding device 100 may include less or more number of components. Further, the labels or names of the components are used only for illustrative purpose and does not limit the scope of the invention. One or more components can be combined together to perform same or substantially similar function to handle secure the on-boarding of the API invoker 110a.

FIG. 3b illustrates various components of the processor 110 of the on-boarding device 100 to handle secure on-boarding of the on-boarding device 100, according to the embodiments as disclosed herein. In an embodiment, the processor 110 includes an API invoker 110a, a TLS session handler 110b, and a secure service provision engine 110c. In an embodiment, the TLS session handler 110b is configured to establish the TLS session with the CCF server 300. Based on the TLS session, the secure service provision engine 110c is configured to send the onboard API invoker request to the CCF server 300 to onboard the API invoker 110a. Further, the secure service provision engine 110c is configured to receive the onboard API invoker response comprising the API invoker profile from the CCF server 300. The secure service provision engine 110c configures the API invoker profile to enable the at least one on-boarding device to access services provided by the CCF server 300 and the service provider 200.

Although the FIG. 3b shows various hardware components of the processor 110 but it is to be understood that other embodiments are not limited thereon. In other embodiments, the processor 110 may include less or more number of components. Further, the labels or names of the components are used only for illustrative purpose and does not limit the scope of the invention. One or more components can be combined together to perform same or substantially similar function to handle secure the on-boarding of the On-boarding device 100.

FIG. 4 illustrates various component of the CCF server 300, according to the embodiments as disclosed herein. In an embodiment, the CCF server 300 includes a processor 310, a communicator 320, and a memory 330. The processor 310 is coupled with the communicator 320, and the memory 330.

The processor 310 is configured to establish the TLS session with the API invoker 110a. Further, the processor 310 is configured to receive the onboard API invoker request from the API invoker 110a using the TLS session to onboard the API invoker 110a. Further, the processor 310 is configured to validate the at least one of the symmetric key-pair, the client certificate associated with the API invoker 110a, and the enrollment information associated with the API invoker 110a. Further, the processor 310 is configured to generate the API invoker profile in response to successful validation of the at least one of the symmetric key-pair, the client certificate associated with the API invoker, OAuth 2.0 access token, and the enrollment information. Further, the processor 310 is configured to send the onboard API invoker response comprising the API invoker profile to the on-boarding device 100.

The processor 310 is configured to execute instructions stored in the memory 330 and to perform various processes. The communicator 320 is configured for communicating internally between internal hardware components and with external devices via one or more networks.

The memory 330 stores instructions to be executed by the processor 310. The memory 330 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 330 may, in some examples, be considered a non-transitory storage medium. The term "non-transitory" may indicate that the storage medium is not embodied in a carrier wave or a propagated signal. However, the term "non-transitory" should not be interpreted that the memory 330 is non-movable. In some examples, the memory 330 can be configured to store larger amounts of information than the memory. In certain examples, a non-transitory storage medium may store data that can, over time, change (e.g., in Random Access Memory (RAM) or cache).

Although the FIG. 4 shows various hardware components of the CCF server 300 but it is to be understood that other embodiments are not limited thereon. In other embodiments, the CCF server 300 may include less or more number of components. Further, the labels or names of the components are used only for illustrative purpose and does not limit the scope of the invention. One or more components can be combined together to perform same or substantially similar function to handle secure the on-boarding of the On-boarding device 100.

FIG. 5 illustrates various components of the processor 310 of the CCF server 300 to handle secure on-boarding of the on-boarding device 100, according to the embodiments as disclosed herein. In an embodiment, the processor 310 includes a TLS session handler 310a, an On-board API invoker handler 310b, and a secure service provision engine 310c.

The TLS session handler 310a is configured to establish the TLS session with the On-boarding device 100. Further, the On-board API invoker handler 310b is configured to receive the onboard API invoker request from the On-boarding device 100 using the TLS session to onboard the On-boarding device 100. Further, the On-board API invoker handler 310b is configured to validate the at least one of the symmetric key-pair, the client certificate associated with the On-boarding device 100, and the enrollment information associated with the On-boarding device 100. Further, the secure service provision engine 310c is configured to generate the API invoker profile in response to successful validation of the at least one of the symmetric key-pair, the client certificate associated with the API invoker, OAuth 2.0 access token, and the enrollment information. Further, the secure service provision engine 310c is configured to send the onboard API invoker response comprising the API invoker profile to the on-boarding device 100.

Although the FIG. 5 shows various hardware components of the processor 310 but it is to be understood that other embodiments are not limited thereon. In other embodiments, the processor 310 may include less or more number of components. Further, the labels or names of the components are used only for illustrative purpose and does not limit the scope of the invention. One or more components can be combined together to perform same or substantially similar function to handle secure the on-boarding of the On-boarding device 100.

FIG. 6 is example scenario of a token based secure on-boarding to handle secure on-boarding of the on-boarding device 100, according to the embodiments as disclosed herein.

As shown in the FIG. 6, the service provider 200 issues the access token (e.g., OAuth 2.0 access token) to on-boarding device 100, which is submitted by the on-boarding device 100 to the CCF server 300 based on the on-boarding request. Consider a first scenario, the service provider 300 shall include the API invoker profile and list of all allowed service APIs information in the OAuth 2.0 access token. In a second scenario, the list of allowed service APIs shall be outside the OAuth 2.0 access token. In both scenarios, the OAuth 2.0 access token shall include JWS (JSON Web signature) from the service provider 200.

The OAuth 2.0 access token can be the SAML (Security Assertion Mark-up Language) token, JSON Web Token or the like. The access tokens authenticate and authorize the API invoker's on-boarding request, if the OAuth 2.0 access token based mechanism is used.

As shown in the FIG. 6, the OAuth 2.0 access token based mechanism can be used to authenticate the API invoker 110a and authorization of API invoker's on-boarding request. The OAuth 2.0 access token received from the service provider 200, shall be encoded as JSON web token, include the JWS (JSON web signature) and shall be validated per OAuth 2.0.

At step 602, the service provider 200 provides the on-boarding information to the On-boarding device 100 to authenticate and communicate with the CCF server 300. The information includes, details of CCF server 300 (e.g., at least one of the Address, and Root CA certificate for validation), OAuth 2.0 access token. The OAuth 2.0 access token will be encoded as the JSON web token (e.g., IETF RFC 7519 or the like) and will embed API invoker information (for example, profile details, subscription details, API invoker ID, or the like), list of allowed Service APIs, in authorization claims section of the OAuth 2.0 access token. The OAuth 2.0 access token shall also include the JSON web digital signature (e.g., IETF RFC 7515 or the like). This information can be provided/provisioned to on-boarding device 100, as a pre-requisite to the on-boarding procedure, over the air, wired, via physical medium or as static configuration on the on-boarding device or a Universal Subscriber Identity Module (USIM) etc.

At step 604, the On-boarding device 100 and CCF server 300 establishes the secure communication channel (e.g., TLS using a server side certificate authentication, a CCF certificate validated by a root CA certificate) using the enrolment information obtained in at the step 602. The TLS connection provides one-way authentication of the CCF based on the CCF certificate i.e., server side certificate based authentication.

At step 606, the On-boarding device 100 generates a key pair (i.e., public key and private key). Over the secure channel, the On-boarding device 100 shall send the on-boarding request to the CCF server 300. The on-boarding request includes the OAuth 2.0 access token (received from the service provider 200), generated public key of the On-boarding device 100 and optionally the list of service APIs.

At step 608, the CCF server 300 validates the OAuth 2.0 access token access token as per OAuth 2.0, IETF RFC 7519 and IETF RFC 7515, optionally including the onboarding request against authorization information (the API invoker information, List of allowed service APIs) in the access token. Alternatively, the CCF 200 sends the token to the issuer (i.e., service provider 200 or a third party) and request for validation of the OAuth 2.0 access token.

At step 610, after successful verification of the on-boarding request, the CCF server 300 generates API invoker profile for each of the on-boarding device 100, wherein the API invoker profile comprising at least one of the API invoker ID (generate a new one or use the API invoker ID if present in the OAuth 2.0 access token or based on service agreement between the service provider 200 and the CCF server 300), the API invoker certificate, the list of accessible service APIs by the On-boarding device 100, and authentication and authorization information for the accessible service APIs (i.e., the selected method for AEF authentication and authorization, and an Onboard Secret).

At step 612, the CCF server 300 sends the on-boarding response to the On-boarding device 100 with the API invoker's profile information generated at the step 610.

FIG. 7 is a flow chart 700 illustrating a method, implemented by the on-boarding device 100, for handling secure on-boarding of the On-boarding device 100, according to the embodiments as disclosed herein. The steps 702-710 are performed by the secure service provisioning engine 110c.

At step 702, the method includes determining at least one of the symmetric key-pair, the client certificate associated with the API invoker, the OAuth 2.0 access token, and the enrollment information associated with the at least one on-boarding device 100. At step 704 the method includes establishing the TLS session with the CCF server 300. At 706, the method includes sending the onboard API invoker request to the CCF server 300 using the TLS session to onboard the at least one on-boarding device 100. At 708, the method includes receiving the onboard API invoker response comprising the API invoker profile from the CCF server 300. At 710, the method includes configuring the API invoker profile to enable the at least one on-boarding device 100 to access services provided by the CCF server 300 and the service provider 200.

The various actions, acts, blocks, steps, or the like in the flow diagram 700 may be performed in the order presented, in a different order or simultaneously. Further, in some embodiments, some of the actions, acts, blocks, steps, or the like may be omitted, added, modified, skipped, or the like without departing from the scope of the invention.

FIG. 8 is a flow chart 800 illustrating a method, implemented by the CCF server 300, for handling secure on-boarding of the on-boarding device 100, according to the embodiments as disclosed herein. The step 802-810 are performed by the secure service provisioning engine 310c.

At 802, the method includes establishing the TLS session with the On-boarding device 100. At 804, the method includes receiving the onboard API invoker request from the On-boarding device 100 using the TLS session to onboard the at least one On-boarding device 100. At 806, the method includes validating the at least one of the symmetric key-pair, the client certificate associated with the On-boarding device 100, and the enrollment information associated with the On-boarding device 100. At 808, the method includes generating the API invoker profile in response to successful validation of at least one of the symmetric key-pair, the client certificate associated with the API invoker, OAuth 2.0 access token, and the enrollment information. At 810, the method includes sending, by the CCF server 300, the onboard API invoker response comprising the API invoker profile to the at least one on-boarding device 100.

The various actions, acts, blocks, steps, or the like in the flow diagram 800 may be performed in the order presented, in a different order or simultaneously. Further, in some embodiments, some of the actions, acts, blocks, steps, or the like may be omitted, added, modified, skipped, or the like without departing from the scope of the invention.

FIGS. 9 and 10 illustrates another example scenario in which system 1000 handles secure on-boarding of the on-boarding device 100, according to embodiment as disclosed herein.

As shown in the FIG. 9, the on-boarding device 100 can access the framework APIs (exposed by the CCF server 300) via CAPIF-1/CAPIF-1e reference points and the service APIs (exposed by the API exposing function) via the CAPIF-2/CAPIF-2e reference points. In order to access such APIs (e.g., framework APIs or Service APIs), the On-boarding device 100 first needs to be (initially should have) on-boarded to the common API Framework. The on-boarding process involves obtaining, from CAPIF server 300, the identifier (ID) of the On-boarding device 100, the authentication information, the authorization information, etc. which is necessary to access the APIs. The proposed method can be used to securely on-board the On-boarding device 100 and provide such necessary information to the On-boarding device 100 and to the CCF server 300 to on-board and also to access the APIs (Framework APIs and Service APIs) later.

Following high level process for on-boarding of an on-boarding device 100:

In an embodiment, the On-boarding device 100 and the service provider 200 establish a service contract and the service provider 200 provides the on-boarding information with the on-boarding device 100.

Further, the on-boarding device 100 requests the CCF server 300 to on-board the On-boarding device 100 by providing the on-boarding information received from the service provider 200.

Further, the CCF server 300 verifies the validity (or verifies the authenticity) of the on-boarding information and provides the API invoker profile i.e. information necessary for accessing the APIs (Framework APIs and Service APIs) securely to the API invoker 200. This provisions the On-boarding device 100 to access the services provided by the CAPIF 300 and the service providers 200. This enables the On-boarding device 100 to consume the CAPIF 300 and the service provider 200 services through the framework and the service APIs securely.

The On-boarding information may constitute of, but not limited to, the following information:

1. Details of the CAPIF Core Function—CCF address, CCF identity and certificate, Root certificate for client/server verification.
2. API invoker authentication information-identity information (anonymous ID, IP Address, IDAI-SP (subscript 'AI-SP' indicates Service provider issued the ID to the API invoker), like so).
3. Security credentials for on-boarding (for example, DH details (like DH Group, elliptic curve details), Root certificate to validate the CCF certificate, Key pair (Private/Public key) with certificate for the API invoker (may be for IDAI-CCF or for IDAI-SP or when IDAI-SP is used as IDAI-CCF), OAuth 2.0 access token, SAML token, JSON Web token, like so).
4. List of service APIs the API invoker is allowed to invoke.

The API invoker profile may constitute of, but not limited to, the following information:

1. An identity of the On-boarding device 100, to be used to invoke the framework APIs and the service APIs. This identity of the On-boarding device 100 can be same as IDAI-SP or could be a different identity, IDAI-CCF, generated by the CCF server 300.
2. If IDAI-CCF is provided, the CCF server 300 should also provide a key pair with certificate signed by the CCF server 300 for the On-boarding device 100. Alternatively, the On-boarding device 100 generates the key pair and the CCF issues the certificate for the On-boarding device 100 for the identity IDAI-CCF or for IDAI-SP. In case of IDAI-SP to be used for IDAI-CCF, then the certificate provided by the service provider 200 or the CCF server 300 or by the trusted CA for the IDAI-SP is used.
3. The On-boarding device 100 is allowed to invoke the list of service APIs.
4. Authentication and Authorization information for the allowed Service APIs.

In another embodiment, the service provider 200 can directly request the CCF server 300 to on-board the On-boarding device 100 by providing the details of the On-boarding device 100 to the CCF server 300. On receiving the request, the CCF server 300 generates the API invoker profile and provides the API invoker profile to the service provider 200. The service provider 200 directly provides the API invoker profile with the API invoker 200. This API invoker profile can be provided/provisioned over the air, wired, via physical medium (e.g., memory stick, memory card) or as static configuration on the device or Universal Subscriber Identity Module (USIM) etc.

The automatic on-boarding process involves providing both, the On-boarding device 100 and the CCF server 300 with the information required for successful on-boarding of the On-boarding device 100.

In another embodiment, the CCF server 300 and the service provider 200 can be co-located. In such deployments, the service provider 200 may not need to share (can be exchanged using internal interfaces) the on-boarding information with the CCF server 300.

Referring to the FIG. 9, at 902, the service provider 200 provides the on-boarding information to the API invoker 110*a*. The API invoker 110*a* uses the on-boarding information to identify and communicate with the CCF server 300. The on-boarding information includes details of the CAPIF core function (e.g., CCF IP address, CCF identity, certificate or the like), the API invoker authentication information (e.g., identity information (for example, anonymous ID, IP address, IDAI-SP like so), security credentials for on-boarding (for example, DH details like DH Group, Root CA to validate the CCF certificate, Key pair with certificate for the API invoker, a Security Assertion Mark-up Language (SAML) token, JSON Web token, like so) and a list of service APIs the API invoker is allowed to invoke.

The information can be provided/provisioned over the air, wired, via physical medium (e.g., memory stick, memory card) or as static configuration on the device or USIM etc.

At 904, the service provider 200 shares the API invoker's on-boarding information with the CCF server 300, so that the CCF server 300 can validate the incoming on-boarding requests on its own. Alternatively, the CCF server 300 may fetch the information from the service provider 200. In an embodiment, the service provider 200 is identified by the CCF server 300 using the IDAI-SP or the On-boarding device 100 provides the details of the service provider 200 to the CCF server 300.

At 906, the On-boarding device 100 and the CCF server 300 establish a secure communication channel (for illustration purpose, using the Diffie-Hellman key exchange for establishment of secret key and then using security mechanism specific to the protocol (like HTTP over TLS carrying necessary information in object formats like JSON, XML, HTML, like so) to protect the communication (may be at the application layer or at the transport layer or at the IP layer).

At 908, the On-boarding device 100 sends an on-boarding request to the CCF server 300. The on-boarding request contains a subset of the on-boarding information that the On-boarding device 100 received from the service provider 200.

At 910, the CCF server 300 validates the received On-boarding information against the information received in at 2.

At 912, if the information validation is successful, the CCF server 300 generates an API invoker profile comprising of at least one of the API invoker ID, List of APIs accessible by the On-boarding device 100 and authentication and authorization information for the accessible APIs. If the CCF server 300 generates an identity for the API invoker, IDAI-CCF, the CCF server 300 may also provide the certificate using the newly assigned ID for the Key pair.

At 914, the CCF server 300 sends the on-boarding response to the API invoker securely. The On-boarding response provides the API invoker with the API invoker Profile generated in at 6.

As shown in the FIG. 10 The On-boarding device 100 provides the information required for successfully requesting the CCF server 300 for on-boarding. On receiving the on-boarding request, the CCF server 300 in-turn contacts the service provider 200 to validate the received information in the on-boarding request. Based on the response from the service provider 200, the CCF server 300 generates the API invoker profile and on-boards the On-boarding device 100.

Referring to the FIG. 10, at 1002, the service provider 200 provides the on-boarding information to the On-boarding device 100. The On-boarding device 100 uses the on-boarding information to communicate with the CCF server 300. The information includes details (at least one of the CCF address, CCF identity, Root certificate), of the CCF server 300, API invoker authentication information (e.g., at least one of the identity information for e.g. anonymous ID, IP Address, IDAI-SP like so), security credentials for on-boarding (for example, DH details like DH Group, root CA to validate the CCF certificate, Key pair with certificate signed by the service provider 200 for the API invoker, SAML token, JSON Web token, like so) and a list of service APIs the API invoker is allowed to invoke. This information can be provided over the air or as static configuration on the device or the USIM etc.

At 1004, the On-boarding device 100 and CCF server 300 establish the secure communication channel (for illustration purpose, using the Diffie-Hellman key exchange for establishment of secret key and then using security mechanism specific to the protocol (JSON or XML) to protect the communication (may be at the application layer or at the transport layer or at the IP layer).

At 1006, the API invoker 300 sends an on-boarding request to the CCF server 300. The on-boarding request contains a subset of the on-boarding information that the On-boarding device 100 received from the service provider 200.

At 1008, the CCF server 300 sends the on-boarding request acknowledgement and acknowledges the receipt of the request.

At 1010, the CCF server 300 sends an on-boarding information validation request to the service provider 200 including the received on-boarding information for validation.

At 1012, the service provider 200 validates the on-boarding information. This process can be automated or can be manual at the service provider 200.

At 1014, once the validation is successful, the service provider 200 sends an on-boarding information validation response to the CCF server 300. The on-boarding information validation response can contain a list of accessible service APIs if the validation was successful.

At 1016, on receiving the on-boarding information validation response, the CCF server 300 generates the API invoker profile comprising of at least one of the API invoker ID, list of APIs allowed for the API invoker, and authentication and authorization information for the accessible APIs. If the CCF server 300 generates the identity for the On-boarding device 100, IDAI-CCF than, the CCF server 300 may also provide the certificate using the new assigned ID for the Key pair.

At 1018, the On-boarding device 100 and CCF server 300 establish the secure communication channel using the Diffie-Hellman key exchange along with an application layer protection mechanism or a TLS session. The connection may be initiated by the On-boarding device 100 (may be after the wait timer indicated by the CCF server 300 at the step 1008) or may be the connection initiated by the CCF server 300.

At 1020, the CCF server 300 sends a notification to the On-boarding device 100 with the API invoker profile securely.

At 1022, the On-boarding device 100 acknowledges the notification from the CCF server 300.

FIG. 11 is another example scenario of the token based secure on-boarding for handling secure on-boarding of the on-boarding device, according to embodiment as disclosed herein.

As shown in the FIG. 11, OAuth 2.0 access token based mechanism can be used to authenticate and authorize API invoker's on-boarding request. This scenario is used with large list of allowed service APIs, which cannot be embedded in the OAuth access token. The list of allowed service APIs shall be outside OAuth access token. The OAuth 2.0 access token shall include JWS (JSON Web signature) signature from service provider 200.

At 1102, the service provider 200 provides the on-boarding information to the On-boarding device 100. Based on the on-boarding information, the On-boarding device 100 authenticates and communicates with the CCF server 300. The information includes, at least one of the details of CCF (at least one of the address, certificate and root CA certificate for validation), OAuth 2.0 access token and list of allowed service APIs. The OAuth 2.0 access token will be encoded as JSON web token (i.e., IETF RFC 7519) and will embed API invoker information (for example, profile details, subscription details, API invoker ID, like so) in authorization claims section of the OAuth 2.0 access token. The OAuth 2.0 access token shall also include the JSON web digital signature (IETF RFC 7515). This information can be provided/provisioned to the On-boarding device 100 over the air, wired, via physical medium or as static configuration on the device or the USIM etc.

At 1104, the On-boarding device 100 and the CCF server 300 establishes the secure communication channel (i.e., TLS using the server side certificate and the CCF certificate validated by a root CA certificate). The TLS connection provides one-way authentication of the CCF server 300 based on the CCF certificate.

At 1106, the On-boarding device 100 generates a key pair (i.e., public key and private key). Over the secure channel, the On-boarding device 100 sends the on-boarding request to the CCF server 300. The on-boarding request will include at least one of the OAuth 2.0 access token (received from the service provider 200), generated public key of the On-boarding device 100 and list of service APIs.

At 1108, the CCF server 300 shall validate the OAuth 2.0 access token and JWS (JSON web signature) as per OAuth 2.0, IETF RFC 7519 and IETF RFC 7515. Post successful validation, the CCF server 300 shall follow process 5 and process 6 to verify the on-boarding request from the On-boarding device 100.

At 1110, the CCF server 300 sends the on-boarding information validation request to the service provider 200 including the received on-boarding information (at least one of the API invoker's information from OAuth 2.0 access token and the list of service APIs) for validation.

At 1112, once the validation is successful, the service provider 200 sends the on-boarding information validation response to the CCF server 300. The on-boarding information validation response can contain the list of accessible service APIs if the validation is successful.

At 1114, after successful verification of the on-boarding request, the CCF server 300 shall generate the API invoker's profile comprising of at least one of the API invoker ID (generates a new one or use the API invoker ID if present in OAuth 2.0 access token or based on service agreement between the service provider 200 and the CCF server 300), the API invoker certificate, the list of accessible service APIs by the On-boarding device 100, authentication and authorization information for the accessible service APIs.

At 1116, the CCF server 300 shall send the on-boarding response along with the API invoker's profile information to the On-boarding device 100.

FIG. 12 is a sequential diagram illustrating a certificate based authentication between the On-boarding device 100 and the CCF server 300 for on-boarding of API invoker for automated secure on-boarding, according to the embodiments as disclosed herein.

At 1202, the service provider 200 provides the on-boarding information to the API invoker 200. Based on the on-boarding information, the On-boarding device 100 authenticates and communicates with the CCF server 300. The information includes, details of CCF (Address, root CA certificate for validation), the key pair (i.e., public key and private key) generated for the On-boarding device 100, the certificate for the On-boarding device 100 (which is digitally signed by the service provider 200 or CAPIF certificate authority or trusted certificate authority, which includes the IDAI-SP and public key generated for the API invoker), IDAI-SP and list of allowed service APIs. This information can be provided/provisioned to the On-boarding device 100 over the air, wired, via physical medium or as static configuration on the device or the USIM etc.

Alternatively, instead of Key pair (i.e., public key and private key) generated by the service provider 200 for the On-boarding device 100, the On-boarding device 100 generates the key pair (i.e., public key and private key) and provide the public key to the service provider before process 1202. So that, the service provider 200 provides the certificate for the On-boarding device 100 (which is digitally signed by the service provider 200 or certificate authority of the CAPIF or trusted certificate authority, which includes the IDAI-SP and public key generated for the On-boarding device 100).

At 1204, the On-boarding device 100 and the CCF server 300 establishes the secure communication channel (i.e., TLS using server and client certificate authentication (i.e. CCF certificate and API invoker certificate are validated by the root certificate).

At 1206, the On-boarding device 100 generates a key pair (i.e., public key and private key). Over the secure TLS session, the On-boarding device 100 sends the on-boarding request to the CCF server 300. The on-boarding request includes API generated public key of the On-boarding device 100 and list of service APIs. In an embodiment, the On-boarding device 100 receives the indication in process 1, whether IDAI-SP is used as IDAI-CCF or new IDAI-CCF will be assigned by the CCF server 300. If the CCF server 300 assigns the IDAI-CCF and indication to generate the key pair is received by the On-boarding device 100, then the On-boarding device 100 generates the key pair (i.e., public pair and private key).

At 1208, the CCF server 300 validates the on-boarding information.

At 1210, after successful verification of the on-boarding request, the CCF server 300 generates the API invoker's profile comprising of the API invoker ID (Generate a new IDAI-CCF), API invoker certificate (which is digitally signed by the service provider 200 or the CAPIF certificate Authority or trusted certificate authority, which includes the IDAI-CCF and public key generated for the On-boarding device 100), the list of accessible service APIs by the On-boarding device 100, authentication and authorization information for the accessible service APIs. Alternately, the CCF server 300 may also generate the key pair (i.e., public key and private key) for the On-boarding device 100 and provides the keys along with the certificate for the On-boarding device 100. The CCF server 300 generates the key pair for the On-boarding device 100, instead of On-boarding device 100 if the CCF server 300 is configured to generate the key pair.

Alternately, instead of generating the new IDAI-CCF by the CCF server 300, the IDAI-SP provided by the service provider 200 is used and also the certificate provided by the service provider 200 for the API invoker is used for subsequent authentication with the CCF server 300

At 1212, the CCF server 300 shall send the on-boarding response to the On-boarding device 100 with the API invoker's profile information generated in at 1210.

FIG. 13 is a sequential diagram illustrating an example scenario in which a DH based key is established between the API invoker 110a and the CCF server 300 for secure on-boarding of the API invoker 110a, according to the embodiments as disclosed herein. At 1302, the service provider 200 provides the on-boarding information to the API invoker. Based on the on-boarding information, the On-boarding device 100 authenticates and communicates with the CCF server 300. The information includes, details of CCF (address, root CA certificate for validation), security information (information on the DH details like, group details or elliptic curve details), IDAI-SP and list of allowed service APIs. This information can be provided/provisioned to the On-boarding device 100 over the air, wired, via physical medium or as static configuration on the device or USIM etc.

At 1304, the API invoker and the CCF server 300 establishes the secure communication channel (using the DH and communication protocol specific security mechanism (like HTTP over TLS carrying necessary information in object formats like JSON, XML, HTML, like so).

At 1306, the On-boarding device 100 generates the key pair (i.e., public key and private key). Over the secure connection, the On-boarding device 100 sends the on-boarding request to the CCF. The on-boarding request includes generated public key of the API invoker and the list of service APIs.

At 1308, the CCF server 300 validates the on-boarding information.

At 1310, after successful verification of the on-boarding request, the CCF server 300 generates API invoker's profile comprising of API invoker ID (Generate a new IDAI-CCF), API invoker certificate (which is digitally signed by the service provider 200 or certificate authority of the CAPIF or trusted certificate authority, which includes the IDAI-CCF and public key generated for the API invoker 200), list of accessible service APIs by the On-boarding device 100, authentication and authorization information for the accessible service APIs.

Alternately, instead of generating the new IDAI-CCF by the CCF server 300, the IDAI-SP provided by the service provider is used and also the certificate provided by the service provider 200 for the API invoker is used for subsequent authentication with the CCF server 300.

At 1312, the CCF server 300 shall send the on-boarding response to the On-boarding device 100 with the API invoker's profile information generated in process 5.

FIG. 14 is a diagram illustrating an API invoker 1400 according to another embodiment of the present disclosure.

Referring to the FIG. 14, the API invoker 1400 may include a transceiver 1410, a processor 1420 and a memory 1430. However, all of the illustrated components are not essential. The API invoker 1400 may be implemented by more or less components than those illustrated in FIG. 14. In addition, the transceiver 1410, the processor 1420 and the memory 1430 may be implemented as a single chip according to another embodiment.

The aforementioned components will now be described in detail.

The transceiver 1410 may include a RF transmitter for up-converting and amplifying a transmitted signal, and a RF receiver for down-converting a frequency of a received signal. However, according to another embodiment, the transceiver 1020 may be implemented by more or less components than those illustrated in components.

The transceiver 1410 may be connected to the processor 1420 and transmit and/or receive a signal. The signal may include control information and data. In addition, the transceiver 140 may receive the signal through a wireless channel and output the signal to the processor 1420. The transceiver 1410 may transmit a signal output from the processor 1420 through the wireless channel.

The processor 1420 may include one or more processors or other processing devices that control the proposed function, process, and/or method. Operation of the API invoker 1400 may be implemented by the processor 1420.

The processor 1420 may obtain, from a service provider, onboarding information including an onboarding credential and information of a CAPIF core function. The processor 1420 may establish a secure session with the CAPIF core function based on the onboarding information. The processor 1420 may control the transceiver to transmit, to the CAPIF core function, an onboard API invoker request message along with the onboarding credential and to receive an onboard API invoker response message based on a result of a validating the onboarding credential at the CAPIF core function.

The memory 1430 may store the control information or the data included in a signal obtained by the API invoker 1400. The memory 1430 may be connected to the processor 1010 and store at least one instruction or a protocol or a parameter for the proposed function, process, and/or method. The memory 1430 may include read-only memory (ROM) and/or random access memory (RAM) and/or hard disk and/or CDROM and/or DVD and/or other storage devices.

FIG. 15 is a diagram illustrating an API invoker 1500 according to another embodiment of the present disclosure.

Referring to the FIG. 15, the API invoker 1500 may include a transceiver 1510, a processor 1520 and a memory 1530. However, all of the illustrated components are not essential. The API invoker 1500 may be implemented by more or less components than those illustrated in FIG. 15. In addition, the transceiver 1510, the processor 1520 and the memory 1530 may be implemented as a single chip according to another embodiment.

The aforementioned components will now be described in detail.

The transceiver 1510 may include a RF transmitter for up-converting and amplifying a transmitted signal, and a RF receiver for down-converting a frequency of a received signal. However, according to another embodiment, the transceiver 1020 may be implemented by more or less components than those illustrated in components.

The transceiver 1510 may be connected to the processor 1520 and transmit and/or receive a signal. The signal may include control information and data. In addition, the transceiver 150 may receive the signal through a wireless channel and output the signal to the processor 1520. The transceiver 1510 may transmit a signal output from the processor 1520 through the wireless channel.

The processor 1520 may include one or more processors or other processing devices that control the proposed function, process, and/or method. Operation of the API invoker 1500 may be implemented by the processor 1520.

The processor 1520 may establish a secure session with an API invoker based on on-boarding information including an onboarding credential. The processor 1520 may receive, from the API invoker, an onboard API invoker request message along with the onboarding credential. The processor 1520 may validate the onboarding credential and control the transceiver to transmit an onboard API invoker response message based on a result of a validating the onboarding credential.

The memory 1530 may store the control information or the data included in a signal obtained by the API invoker 1500. The memory 1530 may be connected to the processor 1010 and store at least one instruction or a protocol or a parameter for the proposed function, process, and/or method. The memory 1530 may include read-only memory (ROM) and/or random access memory (RAM) and/or hard disk and/or CDROM and/or DVD and/or other storage devices.

The embodiments disclosed herein can be implemented using at least one software program running on at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. An application programming interface (API) invoker in a wireless communication system, the API invoker comprising:
   a transceiver; and
   a processor coupled with the transceiver and configured to:
   obtain, from a service provider, via the transceiver, onboarding information including an onboarding credential and information of a common API framework (CAPIF) core function (CCF), wherein the onboarding information is used to authenticate an onboarding of the API invoker to the CCF;
   establish a transport layer security (TLS) session with the CCF using the onboarding information;
   transmit, to the CCF, via the transceiver, an onboard API invoker request message along with the onboarding credential; and
   in case that the onboarding credential is successfully validated, receive, from the CCF, via the transceiver, an onboard API invoker response message including a certificate of the API invoker;

wherein the onboard API invoker response message includes an assigned API invoker identifier (ID), and authentication and authorization information, and wherein the certificate of the API invoker is generated by the CCF, after a successful validation of the onboarding credential.

2. The API invoker of claim 1, wherein the information of the CCF includes an address and a root certificate authority (CA) certificate.

3. The API invoker of claim 1, wherein the processor is further configured to:
generate a key pair including a private key and a public key; and
provide the public key along with the onboard API invoker request message.

4. The API invoker of claim 1, wherein the onboarding credential includes an OAuth 2.0 access token.

5. The API invoker of claim 4, wherein the OAuth 2.0 access token is encoded as a JSON web token.

6. The API invoker of claim 1, wherein the service provider includes an API exposing function (AEF), an API publishing function (APF), and an API management function (AMF).

7. The API invoker of claim 1, wherein the onboard API invoker request message includes a list of APIs in which the API invoker intends to invoke.

8. The API invoker of claim 1, wherein the onboard API invoker response message includes a list of APIs allowed to be invoked.

9. The API invoker of claim 1, wherein the TLS session is established based on a server side certificate authentication.

10. The API invoker of claim 1, wherein the onboard API invoker request message is transmitted after establishing the TLS session.

11. A common application programming interface (API) framework (CAPIF) core function (CCF) in a wireless communication system, the CCF comprising:
a transceiver; and
a processor coupled with the transceiver and configured to:
establish a transport layer security (TLS) session with an API invoker using onboarding information used to authenticate an onboarding of the API invoker to the CCF, wherein the onboarding information includes an onboarding credential and information of the CCF, and is provided from a service provider;
receive, from the API invoker, via the transceiver, an onboard API invoker request message along with the onboarding credential;
validate the onboarding credential; and
in case that the onboarding credential is successfully validated, transmit, to the API invoker, via the transceiver, an onboard API invoker response message including a certificate of the API invoker;
wherein the onboard API invoker response message includes an assigned API invoker identifier (ID), and authentication and authorization information, and wherein the certificate of the API invoker is generated by the CCF after a successful validation of the onboarding credential.

12. The CCF of claim 11, wherein the processor is further configured to:
in response to the successful validation of the onboarding credential generate an API invoker profile including the authentication and authorization information between the API invoker and an API exposing function (AEF).

13. A method performed by an application programming interface (API) invoker in a wireless communication system, the method comprising:
obtaining, from a service provider, onboarding information including an onboarding credential and information of a common API framework (CAPIF) core function (CCF), wherein the onboarding information is used to authenticate an onboarding of the API invoker to the CCF;
establishing a transport layer security (TLS) session with the CCF using the onboarding information;
transmitting, to the CCF, an onboard API invoker request message along with the onboarding credential; and
in case that the onboarding credential is successfully validated, receiving, from the CCF, an onboard API invoker response message including a certificate of the API invoker;
wherein the onboard API invoker response message includes an assigned API invoker identifier (ID), and authentication and authorization information, and
wherein the certificate of the API invoker is generated by the CCF, after a successful validation of the onboarding credential.

14. A method performed by a common application programming interface (API) framework (CAPIF) core function (CCF) in a wireless communication system, the method comprising:
establishing a transport layer security (TLS) session with an API invoker using onboarding information used to authenticate an onboarding of the API invoker to the CCF, wherein the onboarding information includes an onboarding credential and information of the CCF, and is provided from a service provider;
receiving, from the API invoker, an onboard API invoker request message along with the onboarding credential;
validating the onboarding credential; and
in case that the onboarding credential is successfully validated, transmitting, to the API invoker, an onboard API invoker response message including a certificate of the API invoker;
wherein the onboard API invoker response message includes an assigned API invoker identifier (ID), and authentication and authorization information, and
wherein the certificate of the API invoker is generated by the CCF after a successful validation of the onboarding credential.

* * * * *